United States Patent [19]

Bijen

[11] 4,242,407
[45] Dec. 30, 1980

[54] PROCESS FOR THE MANUFACTURE OF ARTICLES OF WATER-HARDENING MATERIAL

[75] Inventor: Jan M. J. M. Bijen, Munstergeleen, Netherlands

[73] Assignee: Stamicarbon, B.V., Geleen, Netherlands

[21] Appl. No.: 971,065

[22] Filed: Dec. 19, 1978

[30] Foreign Application Priority Data

Dec. 30, 1977 [NL] Netherlands .......................... 7714571

[51] Int. Cl.² .......................... B32B 7/00; B32B 3/18; B28B 11/16; B29H 9/02
[52] U.S. Cl. ...................................... 428/247; 156/42; 156/276; 264/136; 264/146; 264/257; 264/258; 264/333; 264/DIG. 47; 428/255; 428/288; 428/910
[58] Field of Search .................. 156/42, 276; 428/255, 428/247, 288, 910; 264/136, 146, 257, 258, DIG. 47, 333, 288.4, 289.6

[56] References Cited

U.S. PATENT DOCUMENTS

| | | | |
|---|---|---|---|
| 3,611,699 | 12/1971 | Winninger et al. | 264/DIG. 47 |
| 3,944,698 | 3/1976 | Dierks et al. | 156/42 |
| 4,065,597 | 12/1977 | Gillespie | 156/42 |
| 4,102,338 | 7/1978 | Parker | 428/255 |
| 4,107,051 | 8/1978 | Lorentzen | 428/255 |
| 4,168,924 | 9/1979 | Draper et al. | 428/255 |

FOREIGN PATENT DOCUMENTS

| | | | |
|---|---|---|---|
| 1509853 | 4/1970 | Fed. Rep. of Germany | 156/42 |
| 1130612 | 7/1967 | United Kingdom | 428/910 |

*Primary Examiner*—William R. Dixon, Jr.
*Attorney, Agent, or Firm*—Cushman, Darby & Cushman

[57] ABSTRACT

An improved process for the manufacture of shaped articles from water-hardening materials reinforced with multiple layers of a fibrillated organic film. A plurality of networks are formed from fibrillated organic films and are simultaneously advanced into contact with a water-hardening material to form a composite layer of the networks impregnated with the water-hardening material. This layer is thereafter formed into the desired configuration for the shaped article, and allowed to set. The average number of meshes within the networks with a minimum of two per square centimeter and the number of networks within the layer are such that the average number of meshes per cubic centimeter of the final shaped article is at least 100.

25 Claims, 2 Drawing Figures

PROCESS FOR THE MANUFACTURE OF ARTICLES OF WATER-HARDENING MATERIAL

BACKGROUND OF THE INVENTION

This invention relates to an improved process for the manufacture of shaped articles from a water-hardening material that has been reinforced with networks of fibrillated organic films.

The term "water-hardening material" as used herein refers to a mixture of a dry or substantially dry binder and water, optionally containing aggregates, that can be hardened or bound into a solid rigid mass by reaction between the binder and water. The term also applies to the hardened material after setting. Suitable binders include, for example, various types of cement, gypsum and other similar materials such as Portland cement, aluminum cement, plaster of Paris and anhydrite.

The use of both man-made and natural reinforcing fibers in a water-hardening material to make shaped articles is well known. The fibers may be either randomly distributed throughout the material, or incorporated as layers of loose fibers. Reinforcement may also be provided by incorporating a mat or fibers in such articles.

Continuous processes are known for the manufacture of articles made from water-hardening material incorporating fibrous reinforcement such as asbestos-cement products. However, it is now known that asbestos fibers constitute a serious health hazard to persons either engaged in or in proximity to the manufacture of asbestos-cement products, and those persons working with (such as cutting or shaping) the manufactured asbestos-cement products. For this reason many attempts have been made to devise substitutes for asbestos-cement products having equivalent mechanical properties and comparable costs, but these efforts have for the most part failed.

It has been proposed to make shaped articles of water-hardening materials reinforced by layers of stretched fibrillated organic films, and promising results have been achieved. But conventional manufacturing techniques such as used in the manufacture of asbestos-cement, including the use of rotary mixing equipment to homogeneously incorporate the reinforcing fibers into the water-hardening material, cannot be used with fibrillated organic films. Rather, time consuming and costly hand building techniques have been used which are not conductive to continuous mass production.

It is therefore an object of this invention to provide a continuous process for the manufacture of shaped articles of reinforced water-hardening materials, which process is flexible both with respect to the content of reinforcing material that may be utilized and the composition of the final article formed. It is a further object of this invention to provide a continuous process for the manufacture of shaped articles comparable or superior to asbestos-cement with respect to both physical properties and cost.

DETAILED DESCRIPTION OF THE INVENTION

The above, and other objects, are achieved by the present invention by simultaneously advancing a number of networks of fibrillated organic films, preferably at least five, into contact with a water-hardening material so as to form a composite layer of the networks impregnated with the water-hardening material. Excess water, if any, can be removed and the resulting layer is compacted and shaped into the desired configuration of the shaped article, and allowed to set. The number of networks incorporated into such layer, and the average number of meshes within the networks with a minimum of two per square centimeter are such that the average number of meshes per cubic centimeter of the final shaped article is at least 100.

As used herein, the word networks should be understood to means the net-like structure resulting from the enlargement of the fibrillated organic film in a direction somewhat lateral to the direction of fibrillation. The term mesh will be used herein to denote the void areas within and defined by the fibers of the network thus formed.

The number of meshes within a given volume of the layer depends upon the number of networks incorporated per unit thickness of such layer, the number, size and type of meshes per network, and the extent to which the networks have been enlarged in size by stretching. Consequently, all of these factors must be selected so that the number of meshes is at least 100 per cubic centimeter of the final shaped article. Preferably, better characteristics are obtained if such number of meshes is at least 200 per cubic centimeter of shaped article, and it is possible to utilize an even higher number of meshes such as over 300, or even over 500 meshes per cubic centimeter of product. The incorporation of such a large number of meshes per unit volume of the shaped article has a very favorable effect upon its bending behavior. With such a high number of meshes, very fine multiple cracking occurs during pseudoplastic deformation of the article with the result that the article more readily regains its former shape, and superior physical properties are obtained. By multiple cracking is meant the phenomenon that an article, when bent or stretched, shows discrete cracks less than 10 mm apart, and most generally these cracks would be smaller than about 0.3 mm.

The number of networks incorporated per centimeter of thickness of the layer is preferably greater than 10, ideally greater than 25, and optimum results are obtained if the number of networks per centimeter of thickness is over 50.

It is very important that the number of meshes in the networks, which have been enlarged in size by stretching of the fibrillated organic film, is at least 2 per square centimeter, and more preferably at least 3 per square centimeter of network. This number is determined by both the degree of stretching or enlargement of the fibrillated organic film, and the number of initial meshes both laterally and longitudinally. This enlargement, which may be effected laterally and longitudinally, will preferably be to a degree of 1½ to 150 times, and more preferably 1½ to 50 times the original dimension. Ideally, the meshes will have a diameter or smallest dimension of about 200 μm. preferably greater than 300 μm.

The percentage by volume of networks in the final product should range between about 0.25 and 20%, and preferably will be between about 2 and 15%. Most preferably, the percentage of networks by volume will be within the range of about 3–10% of the final product. Suitable articles may also be made by providing the above-described concentration of networks and meshes only in the outer portion, having a thickness of at least 1 mm, of the layer or layers forming the shaped article, with a lesser number or no networks in the middle portion of the article.

A network of fibrillated plastic fibers is preferably prepared by extruding an organic plastic material into a film havig a thickness of between about 1 to 1,000 μm, preferably between about 10 and 200 μm. This extruded film can then be cut into bands of appropriate width, if desired, and stretched to, for example, about 10 times the original size. This stretching causes the material to come into a state of imminent fibrillation. The fibrillation is then effected by various known techniques, including passing the stretched film over a roller with nails, a brush or comb introducing slits in the film, or subjecting the film to sheer stresses by means of rollers or air currents. Fibrillation also can be obtained by rotation. In this way, continuous lengths of fibrillated organic films can be produced which can be utilized directly in the process of this invention. Alternatively, a plurality of such fibrillated organic films can be rolled up on a reel, and thereafter unrolled and utilized in the process.

The term continuous as used herein with respect to the fibrillated organic films should be understood to include the use of discrete lengths of such films which are fed into the process from, for example, a reel, but which have a length many times that of the ultimate shaped article. Consequently, the networks according to the present invention consist of continuous fibers, and the elements making the network, such as fibers and fibrils, extend virtually throughout the entire shaped article.

The preferred organic film material for making the network is polyolefin. The network is most advantageously obtained by extruding the polyoelfine, for instance polypropylene, into a film which is stretched to a degree of stretching between 6 and 20, preferably between 6 and 14, and ideally between 8 and 12 times the original dimension. The temperature of the film during stretching should be between about 20° and 160° C., preferably between about 100° and 155° C., but best results are obtained at a temperature of about 130°–150° C. It is preferred that the polypropylene used does not have too high a molecular weight. Preferably the melt index (at 230° C. and 2.16 kg) should be in the range of between 1 and 5, and more preferably between about 2 and 4. This characteristic is very important to proper fibrillation and, hence, the ultimate properties of the reinforced water-hardened articles made therefrom.

The plastics material utilized for the preparation of the fibrillated films may be a polyolefin, but may also be made of any number of thermoplastic materials which form films and fibers, such as polymers of styrene or vinyl chloride, or copolymers thereof. Particularly suitable are partly crystalline polymers such as polyamides and polyesters. Special preferance is given to modified or and preferably unmodified polyolefins. An example of a suitable modified polyolefin is chlorinated polyethylene or polypropylene. Examples of suitable unmodified polyolefins are polyethylene and polypropylene. Polypropylene homopolymer has been found to be most suitable, although copylymers and block copolymers, for example with ethylene, may also be used, as well as mixtures of polymers.

The polymer utilized may also contain various types of fillers and auxillary substances such as carbon black, polar substances, pigments, light and heat stabilizers and antioxidants. It has been found very important that the correct stabilizers are incorporated in the networks, and favorable results have been achieved with a combination of a metal de-activator and an antioxidant. These compounds are used in amounts of from 0.001 to 2.5% by weight, preferably from 0.01 to 1% by weight. The preferred metal de-activators are complexing agents, some examples of which are phosphoric acid, citric acid, ethylene diamine tetra-acetic acid or a salt thereof, N,N'-disalicylidene ethylene diamine, lecithin, gluconic acid, hydrazine derivatives and oxanilide derivatives, particularly N,N'-bis(3,5-ditert-butyl-4-hydroxyphenyl) propionyl hydrazine. Preferably citric acid, whether or not free of water, is chosen as the metal de-activator.

The antioxidant may be chosen from amines, particularly aromatic and secondary amines, such as N,N'-disubstituted p-phenylen diamines, diphenyl amine derivatives, amino-phenol derivatives, condensation products of aldehydes and amines or of ketones and amines. Further suitable antioxidant compounds include sulfur compounds such as mercaptans, thioethers, disulphides, and dithiocarbamates, zinc dimethyl dithiocarbamate being an example. Also phosphorus compounds, such as derivative of phosphoric acid or dithiophosphoric acid, may be used. However, preference is given to the group of amines.

This invention also contemplates the use of film materials which may have been treated with, for example, radiation such as UV light and corona discharge, or oxidizing acids such as chromic acid, to obtain adhesion between the network and the water-hardened mass.

The networks used in this invention can be obtained by stretching the film lengthwise or longitudinally and thereafter fibrillating the film in a known way. However, the film may also be stretched broadwise or laterally before fibrillation. The film should be stretched while at a temperature below the melting point of the plastic material. The plastic film to be stretched and fibrillated may be a substantially flat sheet material, or it may be provided with thickened parts or ridges. The thicker ridges are connected by thinner film parts in which the fibrillation can be more readily effected. These thickened parts or ridges may be initially formed during the extrusion by using an extrusion die of suitable design, or the thicker and thinner parts of the film may be made by use of rollers. The advantage of the latter alternative is that the direction of the ridges can be freely chosen. It is recommended to chose the slit pattern in fibrillation so that the slits are arranged in parallel rows that are at an angle of 20° to 80° to the length of the film and the distance between which is not a greater than twice the size of the slit lengthwise.

The stretched film may be fibrillated by mechanical means, but it is also possible to effect the fibrillation spontaneously by crystallization. In the latter case, measures must be taken to insure that the degree of crystallization is at least 30% by, for example, cooling one of the rollers with which the film is in contact. This latter method of fibrillation is preferably used for films which have been provided with ridges parallel to one another and at an angle of 40°–70° to the direction of transport. In this case, stretching may be effected longitudinally, laterally or both to form the network. Combinations of films thus obtained, having ridges at different angles to the direction of stretching, have been found to yield products having higher strengths.

Networks which have been fibrillated in varying directions, that is longitudinally and laterally, may be applied together in the product. The advantage of such a construction is that the resulting product shows a more isotropic strength. Preferably the directions of fibrillating are virtually normal to one another.

An alternate but not preferred method for obtaining networks which can be utilized in the present process is by weaving long fibers of fibrillated organic film having the necessary spacing to form the proper mesh sizes. But such a technique does not offer the advantages of directly utilizing a fibrillated organic film by stretching it to form the network.

The water-hardening material with which the networks are put in contact contains a water-hardening binder, aggregates if desired, and water. The relative amounts may vary within wide limits, but the ratio between the amount of water and the amount of water-hardening binder generally ranges between about 0.2 and 10. The aggregates used, particularly sand, should preferably be so fine that the average particle size is less than 1 mm, and the amount used may be varied within wide limits. The ratio between the amount of water-hardening binder and the amount of aggregates preferably ranges between about 0.05 and 3.

Various aggregates and/or auxiliary substances may be added to water-hardening material including sand, gravel, chalk, powdered quartz, plastic waste, sulfur, clay, fibers, vulcanized or unvulcanized rubber, rock wool, glass wool, hardening accelerators, pigments and processing aids. It can also be advantageous to add polyvinyl alcohol or polyvinyl acetate to the suspension of water and binder, which may have a favorable effect on the oxygen impermeability of the finished article. These latter additives furthermore serve to better protect the plastic of the network against oxygen diffusing into the article which is particularly important when polypropylene networks are used.

The water-hardening material may additionally contain auxillary substances to improve or accelerate its processing into the end products. Such auxillary substances include so-called deflocculants or other surfaces-active agents, hardening accelerators or retarders, and thickeners. These auxillary substances may be also be incorporated in the film material from which they can be slowly released in a controlled manner. Furthermore, other additives such as flame-retarding and/or flame-proofing agents may be incorporated in the water-hardening material and/or the plastic film from which the network is made. For example, antimony trioxide and chlorinated and/or bromonated compounds, either together or separately, may be processed into one or both of the components.

The products obtained by the present process cannot be made in the conventional manner used in the manufacture of asbestos-cement products, wherein a suspension of the water-hardening material and fibers are mixed to a homogeneous consistency in normal rotating mixing equipment and thereafter processed into layers and hardened. It should be readily apparent that such equipment cannot be utilized with the continuous networks or fibers of the present invention, and heretofore time consuming and costly hand building techniques have been required for the ultimate shaped articles.

These difficulties are overcome by the process of the present invention by forming continuous networks from fibrillated organic films and simultaneously advancing a plurality of such networks into contact with the water-hardening material. The fibrillated organic films can be continuously extruded, stretched and fibrillated and directly fed into the process. Alternatively, the fibrillated films or the networks can be unwound from reels on which they have been stored and continuously advanced into the process. In the latter instance, it is preferable that multiple plies of network are placed on a reel so that they may be unwound and directly and simultaneously contacted with the water-hardening material to form the layer. Also a number of such reels can be simultaneously unwound to provide a greater number of networks.

The enlargement in size of the fibrillated films to form the networks fed into the process may be done by various means known in the art, such as by the employment of tapering chain belts. If the film has been stretched and fibrillated longitudinally, the networks will have to be widened to, for example, ten times the original width. As this widening requires only a relatively slight force, relatively simple methods can be used. One simple but effective method consists of passing the network over curved surfaces, either bent sections or bars, so that the network stretches laterally. The advantage of this method is that no special equipment with moving parts is required for this lateral enlargement.

On the other hand, where the film has been stretched and fibrillated laterally, the desired enlargement must be obtained by lengthening the network longitudinally. This can be very simply effected by making the conveyor roller turn more rapidly than the feed roller, providing faster transport than feed.

The networks after enlargement must be secured to the desired dimension, particularly laterally, for instance by thermal treatment or by means of so-called odd spacers to which the fibers of the network are fixed. If desired, these networks may be provided with thickened parts along the sides of the networks that serve as guides having greater thickness and, hence, greater stiffness. These guides may be fixed to the spacers.

The contacting of networks with the water-hardening material in order to impregnate the networks can be accomplished by various methods. These include pouring in which a suspension of the water-hardening material is formed and poured, by means of a distributor, onto the networks as they are unwound and advanced through the process. Alternatively, the various components of the water-hardening material may be applied by spraying or sprinkling. Any excess water present can be removed for example by vacuum through a porous material, and the resulting layer of networks and water-hardening material is then compacted by vibration and/or compressing so that better coherence is obtained. The layer is thereupon shaped into the desired configuration for the ultimate shaped article and permitted to set. Alternatively, a number of such layers can be formed, continuously brought together, compacted, shaped, and allowed to set, in order to form a shaped article of greater thickness.

A special advantage of the present process that one or more various types of film can be fed together with the networks and incorporated in the layer. These films may be plastic films, or may be films or sheets of paper, cardboard and similar materials, or may be spun, woven or knitted fabrics of natural or man-made materials, or may be metal foil. The films may be provided with meshes if desired, but the area of these meshes should be smaller than the meshes of the networks. If meshes are provided, they may be utilized to discharge excess water when the layer is further processed.

These films may serve a number of various functions including providing a cover film or a decorating film on one or both of the flat or broad sides of the shaped article. Such a film can also be used to enable layers to be readily split at a later stage. The film can also serve as a support during production of the layer or later on as a support for the finished article. For this latter purpose, the film need not be fully closed, and a small mesh area is permissable.

Such a film can also be used to maintain the networks at the desired size or enlargement by attaching them to the film by gluing, stitching, stapling or ultrasonically. The networks can also be attached by use of local heating and melting from high frequency heating, irradiation, hot air, or by putting hot objects in contact with the network layers. The networks may be attached only to one another, rather than to such a film, by these methods as well.

Another advantage of the present invention is that layers of other materials such as foamed polymers or other foamed, expanded or light materials can be incorporated into the product formed. Examples of such materials are expanded polyethylene, polypropylene, polyvinyl chloride, polystyrene or polyurethane, and mineral materials such as perlite, rock wool or glass wool. The additional layer or layers of these materials can impart insulating properties to the products, as well as lower weight, lower price and better protection against moisture and impacts or blows. These additional layers or sheets can be supplied either continuously or intermittently or can be formed in situ, after which the reinforced water-hardening layer is applied. Alternatively, such additional layer or sheet of foam may be applied to the formed layer of water-hardening material and networks.

If desired, a light and/or foamed or expanded material may be processed as an aggregate added into a previously prepared suspension of the water-hardening binder, water and any other aggregate or additives. It is also possible to foam the suspension containing the water-hardening binder itself.

Another application of the products of the present invention is to use them together with fillers incorporated as a separate layer in the ultimate product. An example of such a composition would be a layer of gypsum surrounded by layers of water-hardening material reinforced with networks. If desired, the gypsum layer itself may also be provided with a network reinforcement. It is also possible to apply separate cement layers of different composition, for example, one or more cement layers containing glass beads.

It can thus be appreciated that one of the advantages of the present invention is the wide range of variations that are possible without considerable alteration of the production process. The process of the present invention has the flexibility that the number of networks, and the amount and nature of other materials incorporated in the water-hardening composition can be varied.

DESCRIPTION OF A PREFERRED EMBODIMENT

Figure 1:
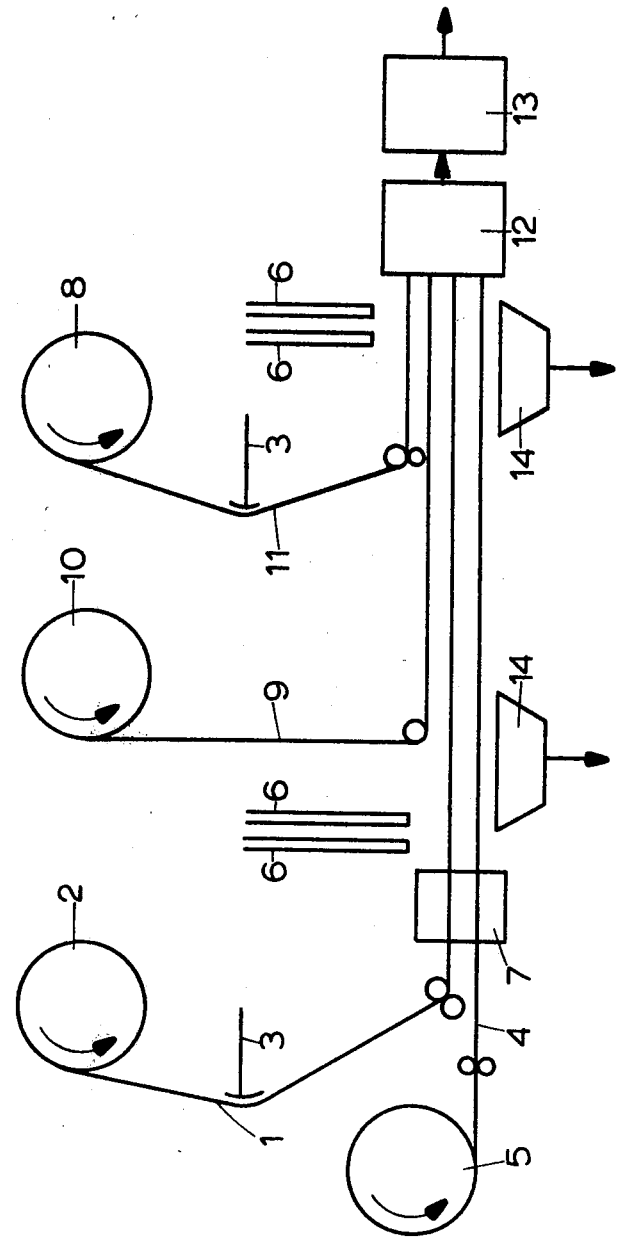
FIG. 1 is a schematic diagram of one embodiment of the process of the present application.

The stretched and fibrillated organic film 1 is payed out from reel 2 as endless web, after which it is given the desired width to form a network by means of spreader 3, consisting of a curved surface in combination with a wedge shaped chain belt (not shown). A plurality of such networks may be supplied together from one reel or from several reels (not shown in the figure). If so desired, another film, such as another plastics material 4, may be supplied from reel 5. The additional film may itself be provided with meshes, and in the embodiment illustrated in the figure, the network can be attached to the film by fixing device 7 by means of glue or heating. The networks are then advanced into contact with the water-hardening material, in this case Portland cement, sand and water fed through conduits 6.

In the particular variant of this embodiment, an additional film having a small mesh area 9 is also incorporated into the resulting layer from reel 10, after which one or more additional networks 11 can be applied to the layer from reel 8. Additional water-hardening material is supplied through conduit 6 by spraying, pouring or sprinkling. The resulting layer is then subjected to pressure to effect proper mechanical binding between the networks and the water-hardening material. The resulting layer is shaped, if desired, in device 12 by compressing and cutting, and then set or hardened in device 13. The final shape may be a sheet, or other shapes such as a tube, corrugated sheet, or box.

The layer obtained before hardening may also be processed into tubes or other articles by wrapping this layer around a mandrel or other mold by rotating the mold. This can be effected continuously by translating the mandrel at slow speed during the rotation. Thereafter the continuous tube thus obtained can be sawn or cut into pieces and allowed to set. It is also possible to apply several layers around the mandrel at various angles thereby giving the resulting article improved strength. The network used in this winding method should preferably be one which has been enlarged comparatively little, although the number of meshes per cubic centimeter in the final product should still be at least 100 and preferably at least 200. For instance, when the network has been stretched lengthwise, the widening should be less than 100%.

The water-hardening material can also be applied to the networks by passing the networks through a bath containing a suspension of the water-hardening material. However, for best results the suspension should contain a surface-active agent in an amount of between about 0.01–5% by weight relative to the weight of the water-hardening material, and preferably an amount of between 0.05 and 4% by weight. Examples of suitable surface-active agents are sulfonated urea formaldehyde resins, cellulose derivatives and sulfonated melamine formaldehyde resins. Other means for applying the water-hardening material include spraying the suspension onto and into the networks, or applying one or more of the components of the water-hardening material to the networks separately.

During the formation of the layers excess water, if any, can be removed by means of suction devices. If desired, the layer during formation can be supported by an endless rotating belt of felt or some other supporting material, not shown in FIG. 1, which preferably is porous.

Figure 2:
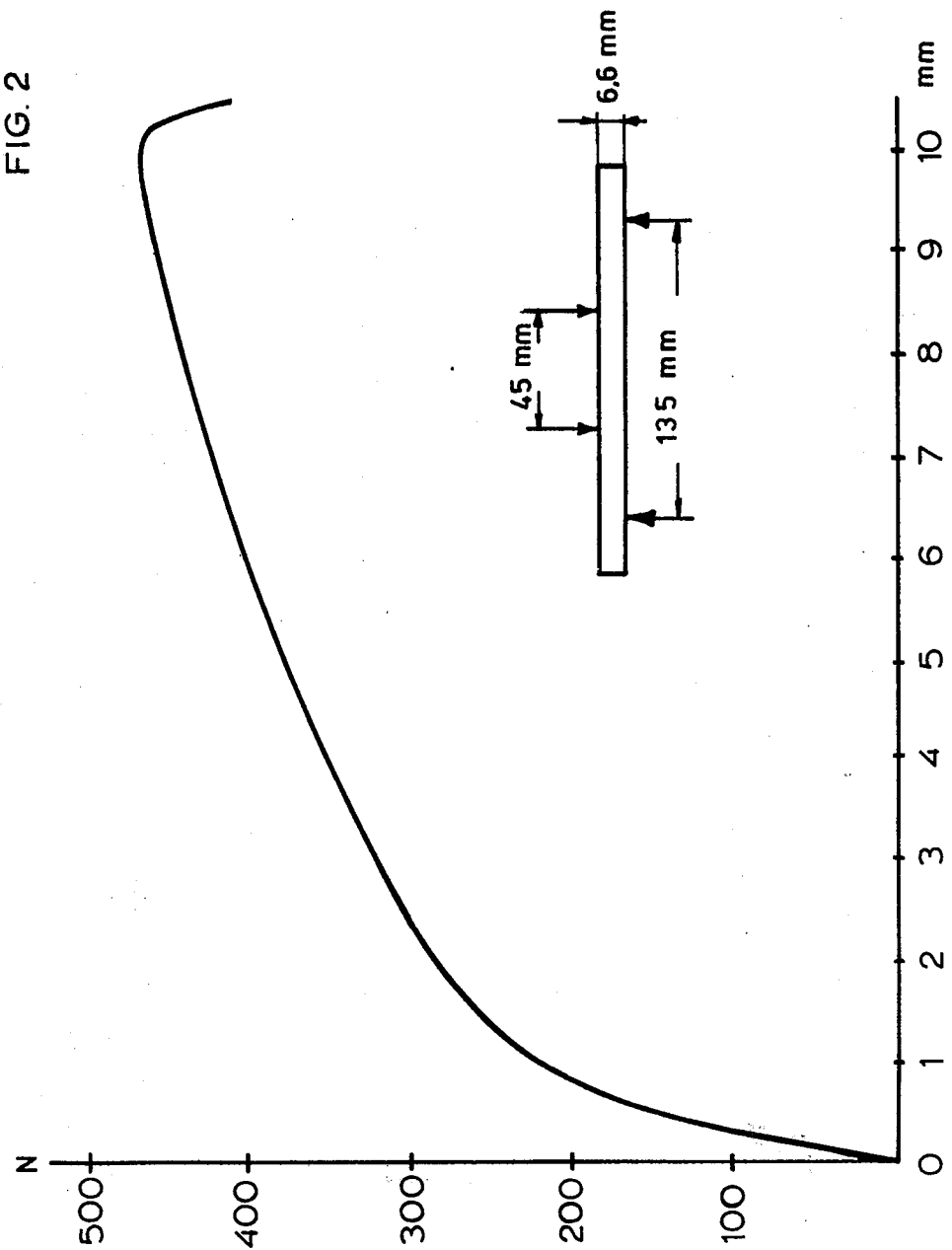
FIG. 2 is a bending curve of a 4-point bending test on product obtained in accordance with the example recording deflection as a function of load.

The materials obtained by this process have properties which in at least some respects are much superior to conventional asbestos-cement. Products made according to the invention exhibit a smooth bending curve as shown in FIG. 2, in which load is plotted against deflection. This smooth bending curve is an indication that very fine multiple cracking occurs, which is a highly desirable characteristic contributing to beneficial properties such as impermeability and recovery from load deflection. Additional advantages of the present process are derived from its flexibility, permitting many variations in the nature of the shaped articles which can be formed. The products produced by the process furthermore have the advantage that they are relatively easy to cut and work with, and can be nailed and screwed without the risk of breaking or tearing.

These products are also capable of use in some places in which no asbestos-cement has been used thus far because of restrictions imposed by its properties. Application of the materials of this invention is primarily found in the building industry where it is utilized in the form of sheets, tubes, corrugated sheets, pipes, panels, boxes and troughs.

EXAMPLE

A sheet was produced in accordance with the process illustrated in FIG. 1 and described above, except that only networks obtained from fibrillated organic films were used. The networks were prepared by extruding polypropylene having a melt index of 2.5 (230° C., 2.16 kg) into a film and stretching the film to a degree of 8 times at a temperature of 140° C., resulting in a final film thickness of 25 $\mu$m. Fibrillation was thereafter effected mechanically by means of a roller with brushes, which produced rows of parallel crevices 12 mm in length. The rows were made at an angle of 43° to the length of the film. Three films were combined having a total thickness of 75 $\mu$m, and were wound on reels 15 at a time. To produce the reinforced cement sheet, 4 reels were used in succession resulting in a total of 180 networks being simultaneously advanced through the process to form the layer and ultimate sheet.

The films were unwound from the reels and the width was enlarged from 6 centimeters to 100 centimeters, and the number of meshes in the resulting networks were 3 meshes per square centimeter. The film was then advanced into contact and impregnated with a suspension of Portland cement A, water and sand. The sand particles had a size range from about 100–200 $\mu$m. The water-cement factor (WCF) was 0.75, and the amount of sand was 20% by weight relative to the cement.

The layer thus formed was subsequently pressed to a thickness of 6.6 mm and cut. The WCF of the cut sheets amounted to 0.25. The final product contained 5% polypropylene networks and had 810 meshes per cubic centimeter of end product. After 28 days of setting at a relative humidity of 95%, the following properties were measured:

Bending strength—30 N/mm² (MPa)
E-modulus—10 GN/mm²
Tensile strength—10 N/mm² (MPa)
Water absorption—7% by volume (after 28 days' setting in water of 20° C.)
Charpy impact strength—40 N/mm²

FIG. 2 shows the curve obtained by plotting force against deflection in a four-point bending test. This curve is very smooth without any discontinuity, which is an indication of a very fine type of multiple cracking. Furthermore, the steepness of the curve in the psuedoplastic range is excellent. This fine type of multiple cracking imparts superior physical properties to the shaped article, including the retention of impermeability, for example to water, and the ability of the article to regain its former shape more rapidly and more completely after the load has been removed. Such fine type of multiple cracking also permits a lower safety factor to be used in strength calculations. These beneficial properties are attributable particularly to the large number of meshes per cubic centimeter of article.

What is claimed is:

1. A shaped article comprised of at least one layer of a water-hardening material reinforced with at least five fibrillated organic films which have been enlarged in a direction approximately lateral to the direction of fibrillation so as to form networks, each having a plurality of meshes, wherein the number of networks in said layer and the average number of meshes in said networks with a minimum of two per square centimeter are such that the average number of meshes per cubic centimeter of said layer is greater than 100.

2. A shaped article comprised of at least one layer of a water-hardening material reinforced with at least five fibrillated organic films which have been enlarged in a direction approximately lateral to the direction of fibrillation so as to form networks, each having a plurality of meshes, wherein the number of networks in said layer and the average number of meshes in said networks with a minimum of three per square centimeters are such that the average number of meshes per cubic centimeter of said layer is greater than 200.

3. A shaped article comprised of at least one layer of a water-hardening material reinforced with at least five fibrillated organic films which have been enlarged in a direction approximately lateral to the direction of fibrillation so as to form networks, each having a plurality of meshes, wherein the number of networks in said layer and the average number of meshes in said networks with a minimum of three per square centimeter are such that the average number of meshes per cubic centimeter of said layer is greater than 300.

4. A shaped article comprised of at least one layer of a water-hardening material reinforced with at least five of fibrillated organic films which have been enlarged in a direction approximately lateral to the direction of fibrillation so as to form networks, each having a plurality of meshes, wherein the number of networks in said layer and the average number of meshes in said networks with a minimum of three per square centimeter are such that the average number of meshes per cubic centimeter of said layer is greater than 500.

5. In a process for the manufacture of shaped articles from water-hardening materials reinforced with a plurality of networks of fibrillated organic films, the improvement comprising the steps of:
   forming continuous lengths of networks from fibrillated organic films, each containing a plurality of meshes;
   simultaneously advancing a plurality of said networks into contact with a water-hardening material so as to form at least one composite layer of said networks impregnated with said water-hardening material; and shaping said at least one layer into the desired configuration for said shaped article, and allowing it to set;
   wherein the average number of meshes within said network, with a minimum of two per square centimeter, and the number of networks within said at least one layer are such that the average number of meshes per cubic centimeter of said shaped article is at least 100.

6. The process of claim 1 wherein excess water in said water-hardening material is removed from said at least one composite layer and said layer is compacted before said layer is shaped.

7. The process of claim 1, wherein said at least one layer has a thickness of at least 1 mm and contains at least 5 networks.

8. The process of claim 1 wherein the number of meshes per cubic centimeter of said shaped article is at least 200.

9. The process of claim 1 wherein the number of meshes per cubic centimeter of said shaped article is at least 300.

10. The process of claim 1 wherein the number of meshes per cubic centimeter of said shaped article is at least 500.

11. The process of claim 1 wherein said shaped article has at least 50 networks per centimeter of thickness of said shaped article.

12. The process of claim 1 wherein the average number of meshes per square centimeter of network is at least 3.

13. The process of claim 1 wherein said fibrillated organic film is obtained by extruding polypropylene into a film, stretching said film, while at a temperature of between about 100° and 155° C., in a longitudinal direction to a degree of about 6–14 times its original dimension, and fibrillating said stretched film.

14. The process of claim 1 wherein at least one film is advanced together with said plurality of networks of fibrillated organic films and is incorporated in said at least one layer formed.

15. The process of claim 14 wherein said at least one film is incorporated in said layer as at least one surface thereof.

16. The process of claim 14 wherein at least one of said plurality of networks is bound to said at least one film.

17. The process of claim 1 wherein an expanded sheet material is incorporated together with said layer.

18. The process of claim 17 wherein said expanded sheet material forms at least one surface of said layer.

19. The process of claim 1 wherein said fibrillated organic film is laterally enlarged to the desired amount to form said network by passing said fibrillated organic film over a curved surface.

20. The process of claim 1 wherein at least one of said plurality of networks is oriented within said layer such that the direction of fibrillation of such network is different from that of at least one other such network.

21. The process of claim 1 wherein said at least one layer is wrapped around a rotating mandrel prior to setting.

22. The process of claim 21 wherein said layer is wrapped around a translating mandrel.

23. The process of claim 1 wherein a plurality of said layers are continuously brought together and thereafter compacted and shaped to form said shaped article.

24. The process of claim 1 wherein said fibrillated organic film is made from a polymeric material containing from 0.001 to 2.5% by weight antioxidant and from 0.001 to 2.5% by weight metal de-activator.

25. The process of claim 1 wherein said fibrillated organic film is made of a polymeric material containing from 0.01 to 1% by weight of a non-phenolic antioxidant and from 0.01 to 1% by weight a complexing agent.

* * * * *